H. KLETT.
STOPPER FOR VACUUM INSULATED VESSELS.
APPLICATION FILED MAR. 9, 1910.

1,019,660.

Patented Mar. 5, 1912.

Witnesses:

Inventor
Hugo Klett

UNITED STATES PATENT OFFICE.

HUGO KLETT, OF ILMENAU, GERMANY.

STOPPER FOR VACUUM-INSULATED VESSELS.

1,019,660.  Specification of Letters Patent.  Patented Mar. 5, 1912.

Application filed March 9, 1910. Serial No. 548,238.

*To all whom it may concern:*

Be it known that I, HUGO KLETT, manufacturer, a subject of the Grand Duke of Saxe-Weimar-Eisenach, residing at Ilmenau, Grand Duchy of Saxe-Weimar-Eisenach, Germany, have invented certain new and useful Improvements in Stoppers for Vacuum-Insulated Vessels, of which the following is a specification.

The present invention has reference to stoppers for vacuum-insulated vessels, and it comprehends primarily a special form of stopper for sealing or closing the space or chamber between the double walls of the vessel after the creation of the vacuum therein has been completed.

A structural embodiment of the invention is illustrated in the accompanying drawing, whereof—

Figure 1:
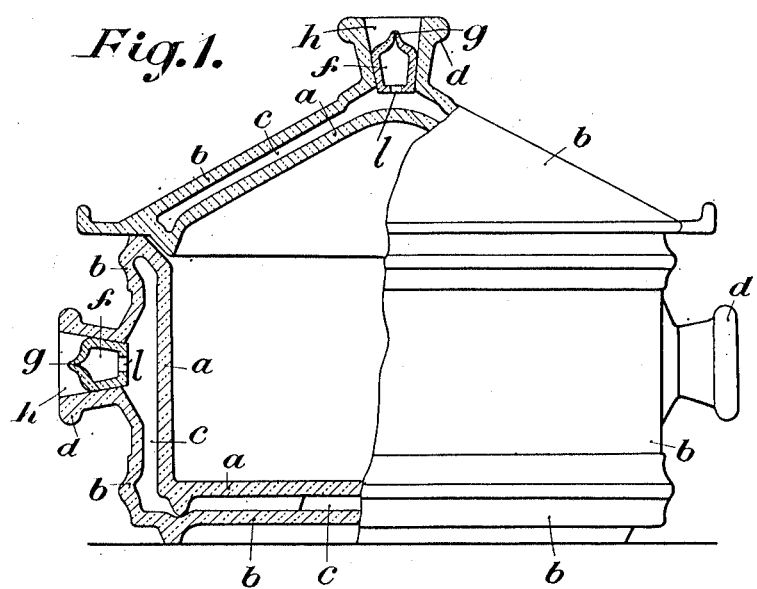
Figure 2:
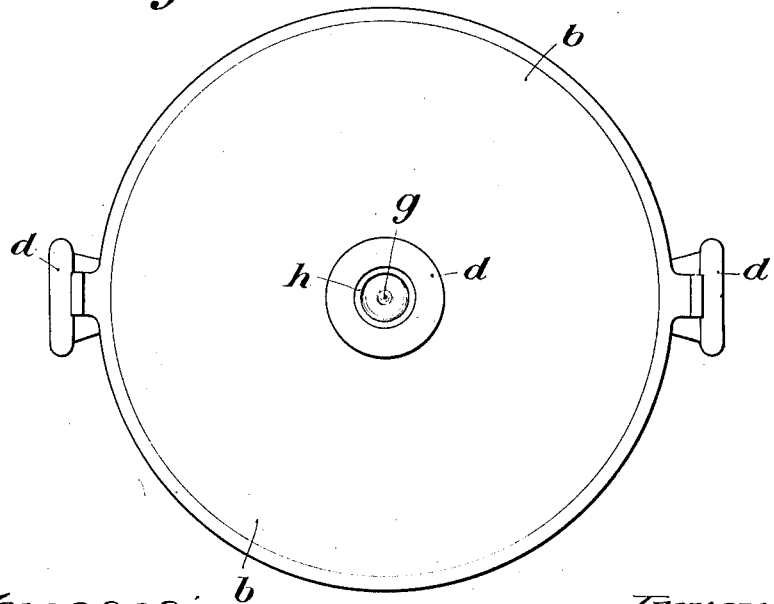

Figure 1 is a vertical sectional view, with parts in elevation, of a vessel of the above-described type, furnished with the improved stoppers; and Fig. 2 is a plan view.

The vessel proper and its cover are each provided with an inner wall $a$ and an outer wall $b$ which are glazed upon both sides and are connected together. The outer walls of both of the parts mentioned are formed at suitable points with tubular projections $d$ whose bores open into the spaces or chambers $c$ between said walls and the inner walls $a$. Each of these projections receives a stopper $f$ which is ground or otherwise tightly fitted therein. These stoppers are hollow, as shown in Fig. 1, and are constructed of glass or other suitable vitreous material; their inner end walls are provided with openings $l$ which form a means of communication between the interior of the stoppers and the adjacent space or chamber $c$, and their outer end walls are provided with nipples $g$. The air contained in said spaces or chambers is exhausted therefrom through the stoppers in any preferred manner, and, after the completion of that operation, the nipples are fused or melted and closed, thereby sealing said spaces or chambers. Finally, the outer ends of the bores of the said projections $d$ are filled with a rapidly-solidifying substance or material, as indicated by the letter $h$, Fig. 1.

I claim as my invention:

1. A hollow stopper of fusible vitreous material for use in connection with double walled vessels having an air space between said walls, wherein a vacuum is to be created, said stopper being formed at its inner end with an opening communicating directly with said air space and at its outer end with a nipple adapted to be closed by melting after the creation of the vacuum in the air space has been completed.

2. A hollow open-ended glass stopper for use in connection with double walled vessels having an air space between said walls, wherein a vacuum is to be created, the outer end of said stopper being adapted to be closed by melting after the creation of the vacuum in the air space has been completed.

In testimony whereof I have hereunto set my hand in presence of two subscribing witnesses.

HUGO KLETT.

Witnesses:
 ERNST EBERHARDT,
 BERTICE B. BUSSER.